(12) United States Patent
Ferrer et al.

(10) Patent No.: US 11,570,265 B2
(45) Date of Patent: *Jan. 31, 2023

(54) DATA TRANSMISSION METHOD AND SYSTEM

(71) Applicant: SPARKLE CS LTD., Harrow (GB)

(72) Inventors: Judd Ferrer, Beckingham (GB); Mark Brighton, Basingstoke (GB)

(73) Assignee: SPARKLE CS LTD, Harrow (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/557,468

(22) Filed: Dec. 21, 2021

(65) Prior Publication Data

US 2022/0116466 A1 Apr. 14, 2022

Related U.S. Application Data

(63) Continuation of application No. 17/071,738, filed on Oct. 15, 2020, now Pat. No. 11,240,323, which is a continuation of application No. 14/912,282, filed as application No. PCT/GB2014/052499 on Aug. 14, 2014, now Pat. No. 10,855,781.

(30) Foreign Application Priority Data

Aug. 16, 2013 (GB) .................. 1314732

(51) Int. Cl.
*H04L 67/53* (2022.01)
*G06Q 20/20* (2012.01)
*H04L 69/321* (2022.01)
*H04L 67/561* (2022.01)

(52) U.S. Cl.
CPC .......... *H04L 67/53* (2022.05); *G06Q 20/202* (2013.01); *G06Q 20/208* (2013.01); *H04L 67/561* (2022.05); *H04L 69/321* (2013.01)

(58) Field of Classification Search
CPC .......................... H04L 67/561; H04L 69/321
See application file for complete search history.

(56) References Cited

U.S. PATENT DOCUMENTS

| | | | |
|---|---|---|---|
| 6,360,138 B1* | 3/2002 | Coppola | G07F 7/1008 700/231 |
| 2004/0059634 A1 | 3/2004 | Tami | |
| 2005/0233797 A1 | 10/2005 | Gilmore | |
| 2005/0257226 A1* | 11/2005 | Belvin | G06F 9/4413 719/318 |

(Continued)

FOREIGN PATENT DOCUMENTS

| | | |
|---|---|---|
| EP | 1 594 052 | 11/2005 |
| EP | 2 426 593 | 3/2012 |

OTHER PUBLICATIONS

International Search Report for PCT/GB2014/052499 dated Nov. 14, 2014, four (4) pages.

(Continued)

*Primary Examiner* — Caroline H Jahnige
(74) *Attorney, Agent, or Firm* — Nixon & Vanderhye, P.C.

(57) ABSTRACT

The present invention relates to a data transmission method including injecting signals into a communications channel between a predefined hardware device for a computing system and an application executing on the computing system, for receipt by the application. A data transmission system is also disclosed.

23 Claims, 9 Drawing Sheets

(56) References Cited

U.S. PATENT DOCUMENTS

| | | |
|---|---|---|
| 2007/0027560 A1 | 2/2007 | Nakazawa et al. |
| 2007/0050751 A1* | 3/2007 | Husmann ............... G06F 9/541 717/105 |
| 2007/0100936 A1 | 5/2007 | Lum |
| 2007/0160200 A1 | 7/2007 | Ishikawa |
| 2007/0229519 A1 | 10/2007 | De Souza et al. |
| 2007/0276763 A1* | 11/2007 | Kleinman ............ G06Q 20/202 705/64 |
| 2008/0148383 A1 | 6/2008 | Pitchaikani et al. |
| 2008/0283590 A1 | 11/2008 | Oder, II |
| 2009/0113145 A1 | 4/2009 | Slater |
| 2009/0187847 A1 | 7/2009 | Mercer |
| 2010/0010905 A1 | 1/2010 | Arzumanyan |
| 2011/0184822 A1 | 7/2011 | Matkovic |
| 2011/0214131 A1* | 9/2011 | Luna ..................... G06F 9/541 719/318 |
| 2011/0246284 A1 | 10/2011 | Chaikin |
| 2012/0016856 A1 | 1/2012 | Gandhi |
| 2012/0057184 A1 | 3/2012 | Furuhata |
| 2012/0216072 A1 | 8/2012 | Zeigler |
| 2012/0246472 A1 | 9/2012 | Berengoltz |
| 2012/0254897 A1* | 10/2012 | Ng ....................... G07G 1/0009 719/321 |
| 2012/0270538 A1 | 10/2012 | Meylan et al. |
| 2013/0013390 A1 | 1/2013 | Paulson-Ellis |
| 2013/0041831 A1 | 2/2013 | Das |
| 2013/0304553 A1 | 11/2013 | Hertel |
| 2014/0214576 A1* | 7/2014 | Ferlin .................... G06Q 30/06 705/21 |
| 2014/0222545 A1* | 8/2014 | Hajji .................... G06Q 20/202 705/16 |

OTHER PUBLICATIONS

Written Opinion of ISA for PCT/GB2014/052499 dated Nov. 14, 2014, four (4) pages.

International Search Report dated Nov. 13, 2014, issued in International Application No. PCT/GB2014/052501, 4 pages.

Written Opinion of the International Searching Authority dated Nov. 13, 2014, issued in International Application No. PCT/GB2014/052501, 9 pages.

Office Action dated Sep. 30, 2016, issued in U.S. Appl. No. 14/912,276, 20 pages.

Office Action dated May 11, 2017, issued in U.S. Appl. No. 14/912,276, 16 pages.

Office Action dated Dec. 14, 2017, issued in U.S. Appl. No. 14/912,276, 17 pages.

Intent to Grant dated Sep. 18, 2020, issued in EP 14761392.1, 5 pages.

Intent to Grant dated May 19, 2020, issued in EP 14761392.1, 5 pages.

Communication from the Examining Division dated Feb. 26, 2019, issued in EP 14761392.1, 8 pages.

Intent to Grant dated Sep. 10, 2020, issued in EP 14761392.1, 57 pages.

* cited by examiner

DATA TRANSMISSION METHOD AND SYSTEM

This application is a continuation of U.S. application Ser. No. 17/071,738, filed Oct. 15, 2020, which is a continuation of U.S. application Ser. No. 14/912,282, filed Feb. 16, 2016, which is the U.S. national phase of International Application No. PCT/GB2014/052499 filed 14 Aug. 2014 which designated the U.S. and claims the priority of GB Patent Application No. 1314732.7 filed 16 Aug. 2013, the entire contents of each of which are hereby incorporated by reference.

FIELD OF INVENTION

The present invention is in the field of data transmission. Particularly, but not exclusively, the present invention relates to the injection of data into a hardware device communications channel to enable the transmission of data to, for example, a legacy computing system.

BACKGROUND

It is often desirable to add functionality to deployed technology architectures. However, introducing new functionality often requires substantial modification to the already deployed technology. Modification is generally undesirable as it can introduce unexpected effects within interoperating technology and increase the chances of errors occurring within complex technology.

One field which finds it challenging to improve functionality is the retail sector, particularly in regard to their point-of-sale terminals which tend to be installed and operated by monopoly technology providers.

Retail is, conversely, a field which would derive tremendous advantage from new processes. For example, coupons in new forms have attracted the interest and engagement of consumers. Retailers would like to implement new and intelligent processes for managing coupons in their stores.

Accordingly, there is a desire for additional functionality deploying new processes to be added to legacy computing systems, in particular in retail.

With couponing, there are several improvements that would usefully improve the functionality of existing retail systems. For example, it may be desirable for a retailer to easily apply coupons, such as digital coupons, that cannot be scanned.

To implement these improvements, an improved data transmission method and system which is easy to deploy into legacy environments is required.

It is an object of the present invention to provide a data transmission system which overcomes the disadvantages of the prior art, or at least provides a useful alternative.

SUMMARY OF INVENTION

According to a first aspect of the invention there is provided a data transmission method, including: constructing a communications channel between a peripheral device for a computing system and an application executing on the computing system; and injecting signals into the communications channel for receipt by the application.

According to a first aspect of the invention there is provided a data transmission system, comprising: a processor configured for constructing a communications channel between a peripheral device for a computing system and an application executing on the computing system and injecting signals into the communications channel for receipt by the application; and a communications module configured for communicating with an application executing on the computing system via the communications channel.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a data transmission method.

The inventor has discovered that data can be transmitted to a legacy computing system, such aa a POS terminal system, by injecting data into a communications channel with a hardware device and the computing system.

For example, a POS terminal may be configured to receive barcode information from a barcode scanner hardware input device to the POS terminal computing system. Data can be spoofed to appear to come from a barcode scanner and injected into the communications channel to the POS terminal application software.

Figure 1:
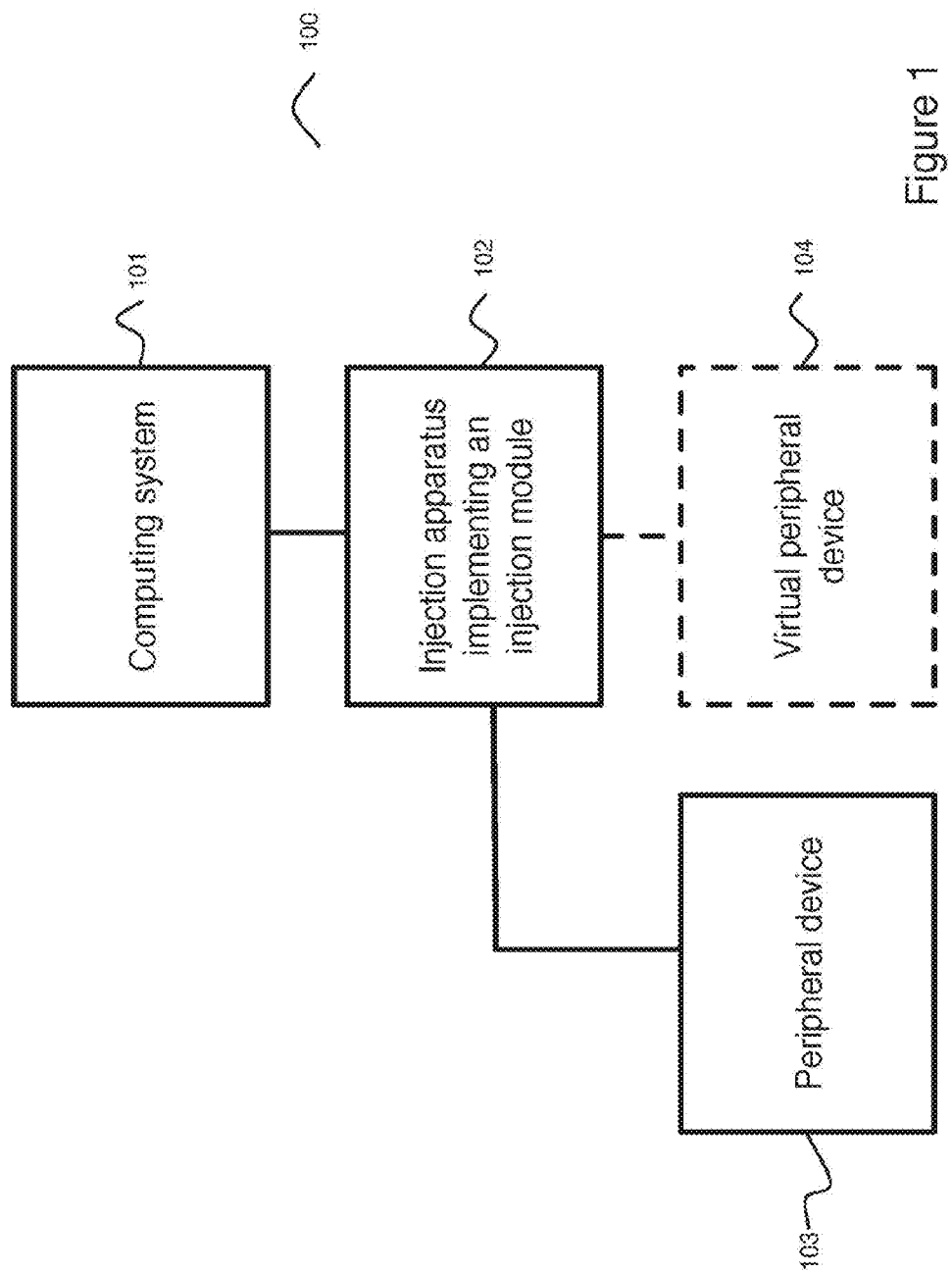
FIG. 1: shows a data transmission system in accordance with an embodiment of the invention.

In FIG. 1, a data transmission system 100 in accordance with an embodiment of the invention is shown.

A computing system 101 is shown. The computing system 101 is configured to execute a software application. The computing system 101 may be a point-of-sale (POS) terminal configured to execute an electronic point-of-sale (EPOS) software application.

The computing system 101 includes a processor and a memory.

An injection apparatus 102 implementing an injection module is shown. The injection apparatus 102 may be connected to the computing system 101, for example, by a port on the computing system 101. The connection permits signals to be transmitted and received between the injection apparatus 102 and computing system 101.

The injection apparatus 102 includes a processor and a memory.

A peripheral device 103 is shown. The peripheral device 103 may be an input hardware device, such as a QR scanner, a NFC reader, or a camera.

In an alternative embodiment, the data transmission system 100 does not require the peripheral device 103.

The peripheral device 103 may be connected to the injection apparatus 102 such that signals can be transmitted and received between the injection apparatus 102 and the peripheral device 103.

A virtual peripheral device 104 is shown. The virtual peripheral device 104 may be an input hardware device, such as a barcode scanner, or any other type of input device. The virtual peripheral device 104 is virtual in the sense that it does not exist, but its existence is spoofed to the application on the computing system 101 by the injection apparatus 102.

The injection apparatus 102 may be configured to create a communications channel which appears to come from the virtual peripheral device 104 and the application executing on the computing system 101. The injection apparatus 102 may be further configured to inject signals into the communications channel between the virtual peripheral device 104 and the application on the computing system 101.

The injection apparatus 102 may be configured to process signals received from the actual peripheral device 103 and generate signals in response for injection into the communications channel.

Figure 2:
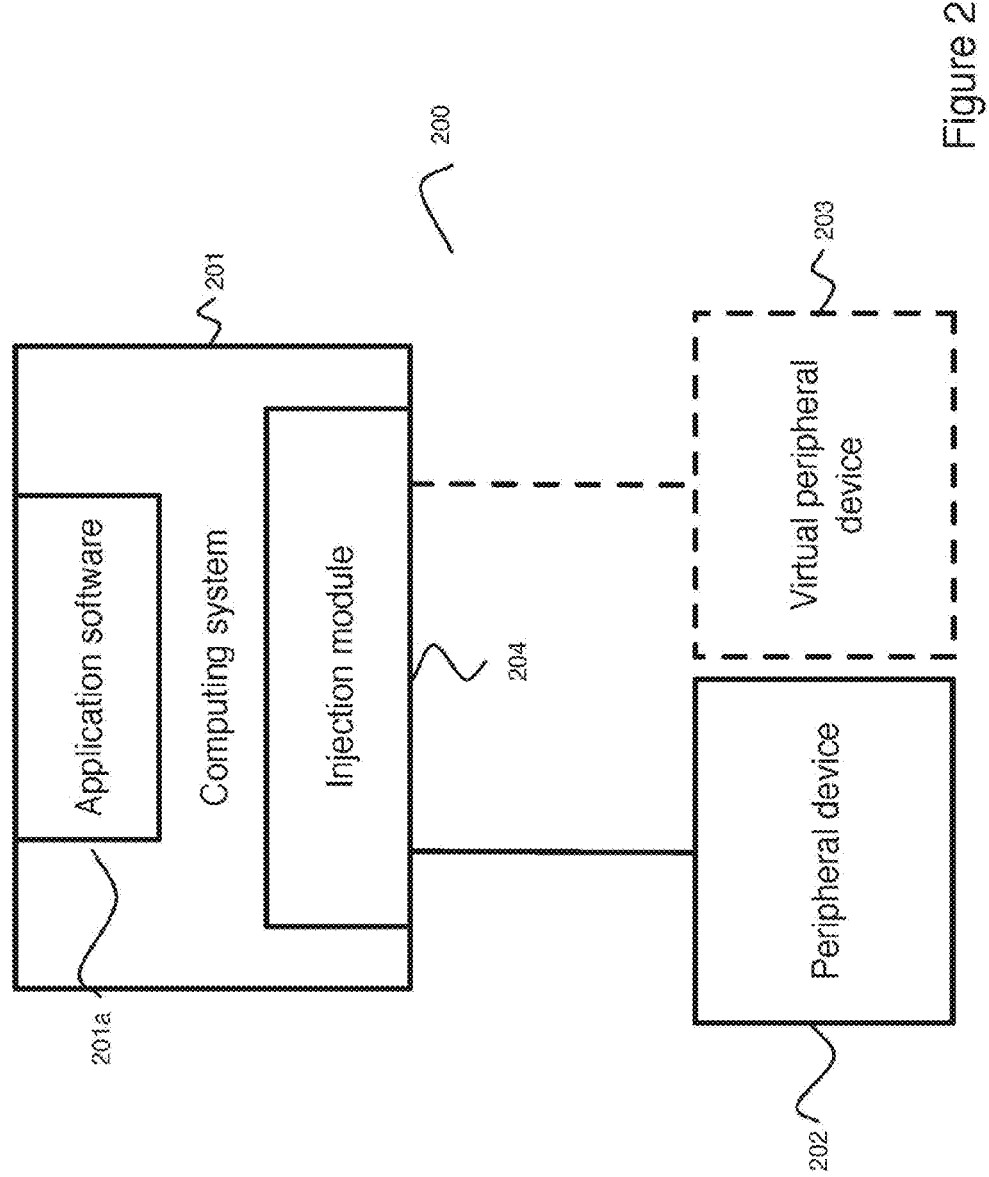
FIG. 2: shows another data transmission system in accordance with an embodiment of the invention.

In FIG. 2, a data transmission system 200 in accordance with another embodiment of the invention is shown.

A computing system 201 is shown. The computing system 201 is configured to execute a software application 201a The computing system 201 may be a point-of-sale (POS) terminal configured to execute an electronic point-of-sale (EPOS) software application.

The computing system 201 includes a processor and a memory.

A peripheral device 202 is shown. The peripheral device 202 may be an input hardware device, such as a QR scanner, a NFC reader, or a camera.

In an alternative embodiment, the data transmission system 200 does not require the peripheral device 202.

The peripheral device 202 is connected to the computing system 201 such that signals can be transmitted and received between the computing system 201 and the peripheral device 202.

A virtual peripheral device 203 is shown. The virtual peripheral device 203 may be an input hardware device, such as a barcode scanner, or any other type of input device. The virtual peripheral device 203 is virtual in the sense that it does not exist, but its existence is spoofed to the application 201a on the computing system 201 by an injection module 204.

The computing system 201 may be further configured to execute the injection module 204.

The injection module 204 may be configured, in turn, to create a communications channel which appears to come from the virtual peripheral device 203 and the application 201a executing on the computing system 201. The injection module 204 may be further configured to inject signals into the communications channel between the virtual peripheral device 203 and the application 201a on the computing system 201.

The injection module 204 may be configured to process signals received from the actual peripheral device 202 and generate signals in response for injection into the communications channel.

Figure 3:
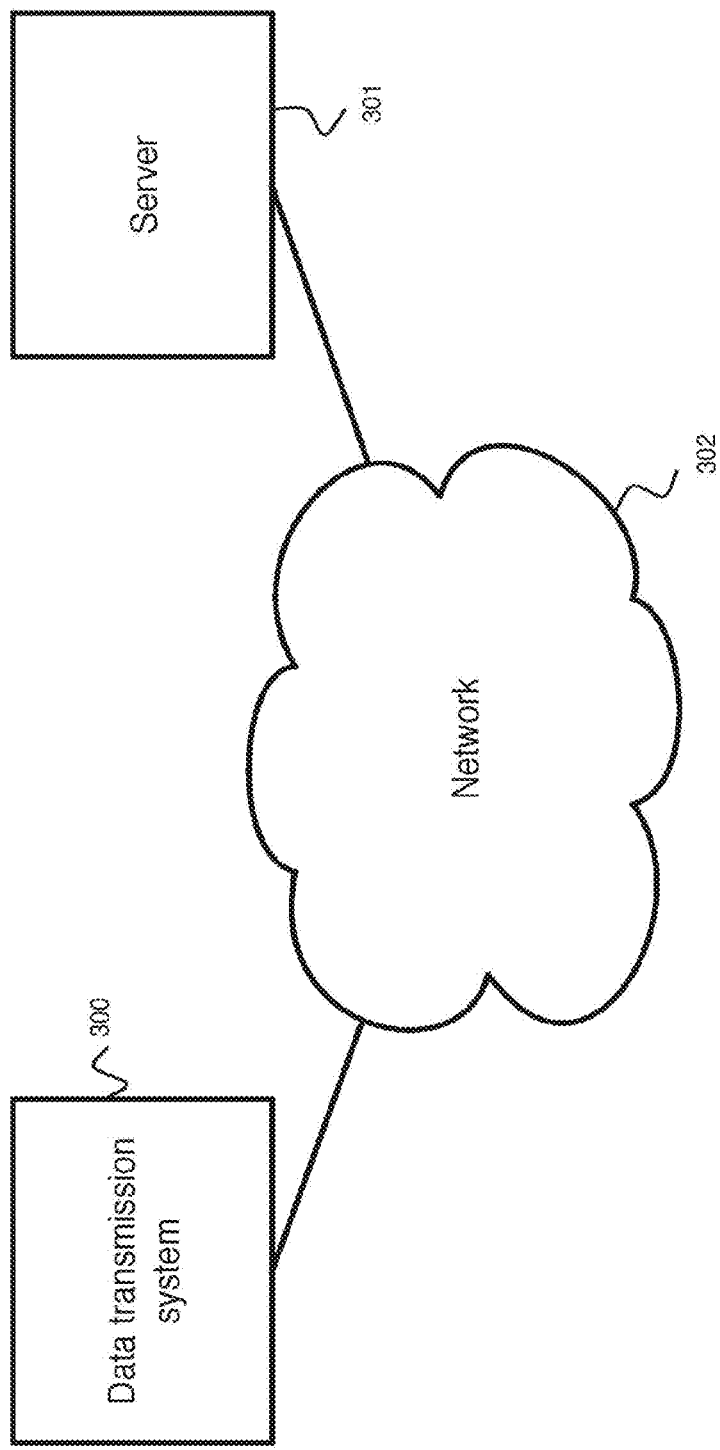
FIG. 3: shows a communications architecture in accordance with an embodiment of the invention.

In FIG. 3, an exemplary deployment of a data transmission system 300 within a network architecture in accordance with an embodiment of the invention is shown.

A data transmission system 300 as described in relation to FIG. 1 or 2 is shown.

The data transmission system 300 may be further configured to communicate with a server 301 via a network 302.

Figure 4:
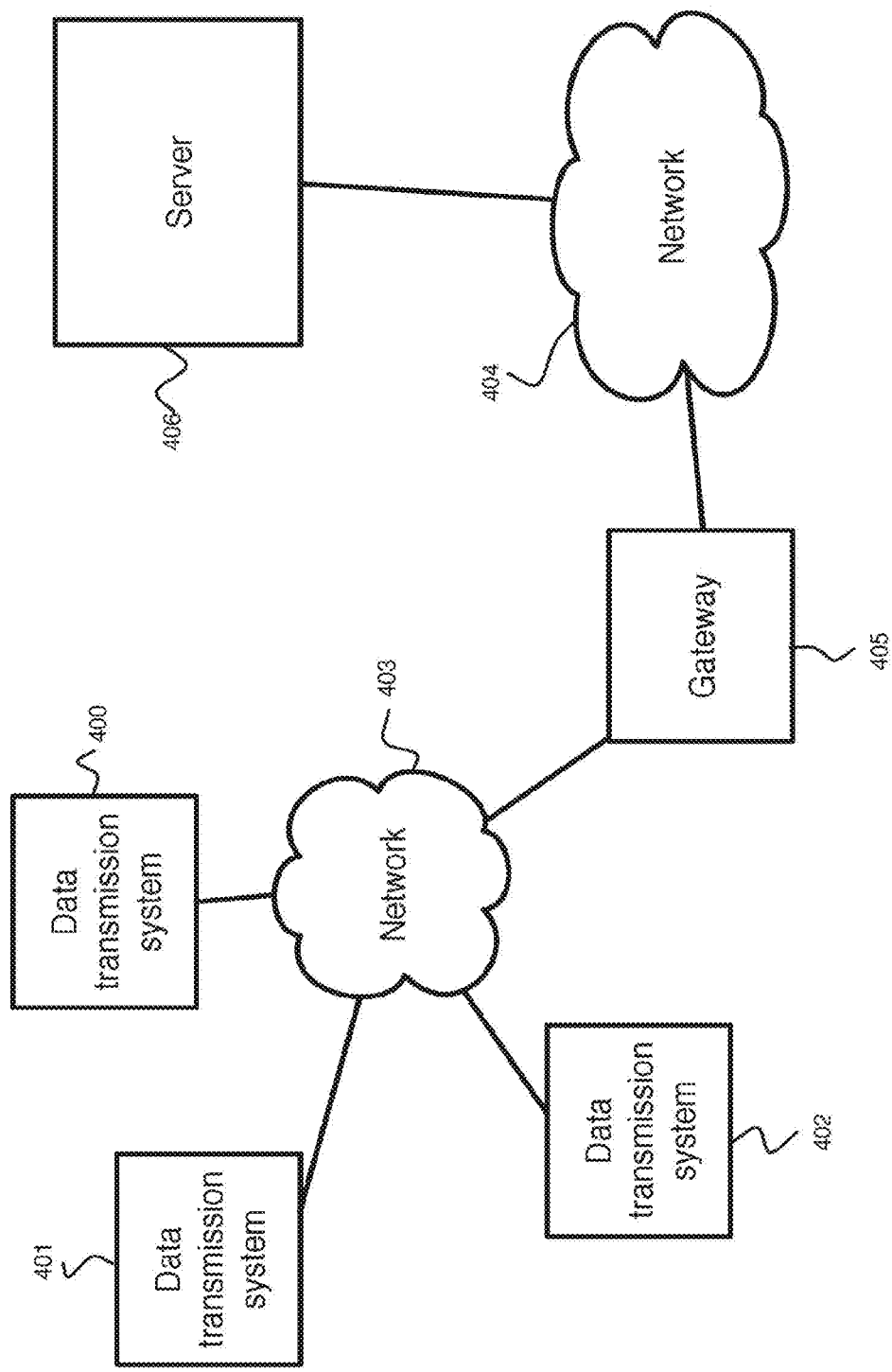
FIG. 4: shows another communications architecture in accordance with an embodiment of the invention.

In FIG. 4, an alternative exemplary deployment of a data transmission system within a network architecture in accordance with an embodiment of the invention is shown.

A plurality of data transmission systems 400, 401, and 402 as described in relation to FIG. 1 or 2 are shown.

The data transmission systems 400, 401, and 402 may be connected to a network 403. The network 403 may be connected to a second network 404 via a gateway 405.

The data transmission systems 400, 401, and 402 may be further configured to communicate with a server 406 via the first network 403, the gateway 405, and the second network 404.

It will be appreciated that alternative deployments of the data transmission system may be envisaged. For example, with cloud computing architectures, functions may be distributed amongst a plurality of devices or servers, which may be interconnected by various network and communication configurations.

Figure 5:
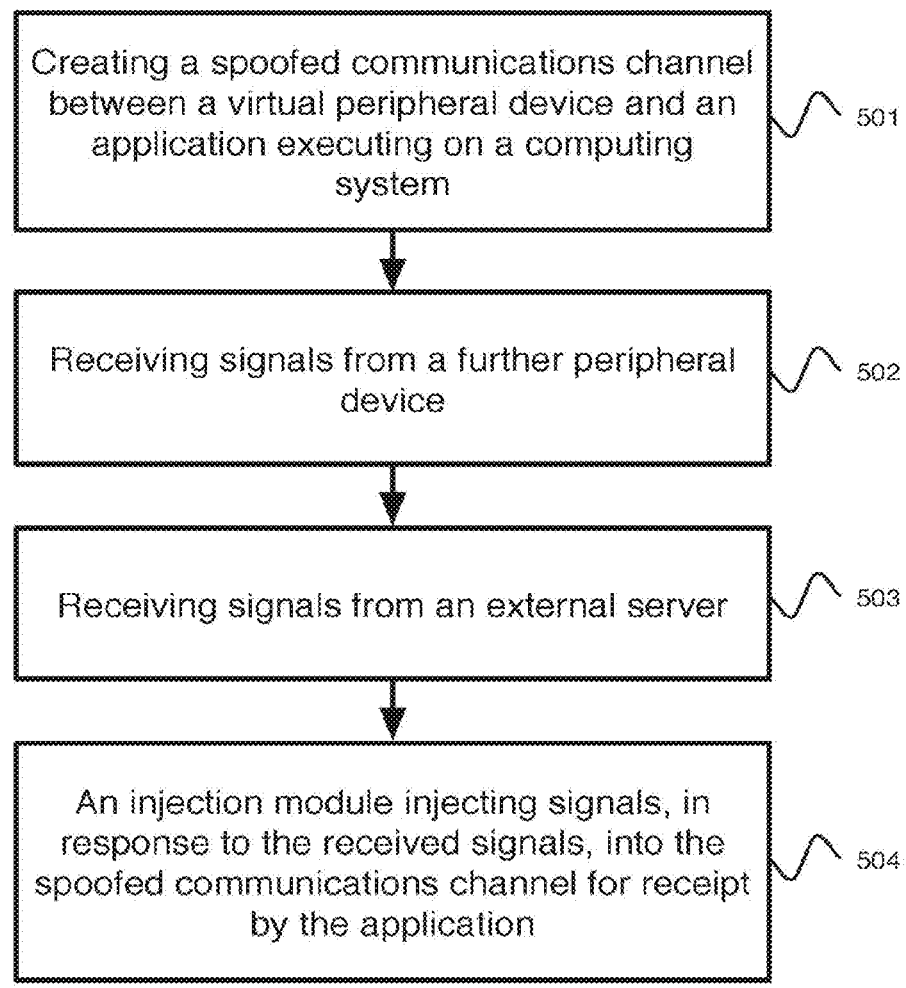
FIG. 5: shows a low chart illustrating a method in accordance with an embodiment of the invention.

In FIG. 5, a method 500 in accordance with an embodiment of the invention is shown.

In step 501, a communications channel is constructed between a first peripheral and an application executing on the computing system by an injection module. The communications channel may be spoofed, in that the first peripheral may not exist.

In step 502, signals may be received from a further peripheral device by the injection module. The signals may be related to data captured by the further peripheral device. For example, the further peripheral device may capture and encode QR data, NFC information, or photographic information. The further peripheral device may not be directly supported by the application software on the computing system.

In one embodiment as shown in step 503, signals may be received from an external server. The signals may be received in response to signals received in step 502 and transmitted on to the server, or in response to events triggered at the server.

In one embodiment, the injection module may as part of the processing generate the display of a prompt to the operator of the computing system. The prompt may be displayed on a display of the computing system or the prompt may be displayed on an external display connected, for example, to the injection apparatus. The operator response to the prompt can be received by the injection module and determine the content or type of signals to be injected.

In step 504, the injection module injects signals into the communications channel between the first peripheral device for a computing system and an application executing on the computing system, for receipt by the application.

The signals injected may be those received, or new signals may be created in response to those signals.

For example, the injection module may reprocess the received signals into a message format that the application software is expecting, and/or the injection module may capture the received signals and generate new signals in response at times and in a sequence that is expected by the application software.

Signals may be received from multiple peripheral devices and be processed by the injection module to generate one or more new signals for injection into the spoofed communications channel.

In one embodiment, the injection module may be also configured to intercept signals from a third peripheral device, such as a peripheral configured for use with the application software (i.e. a bar-code scanner for use with a POS terminal), that forms a communications channel with the application software. The injection module may be configured to process those signals in conjunction with the signals received from the further peripheral to generate new signals in the spoofed communications channel.

Figure 6:
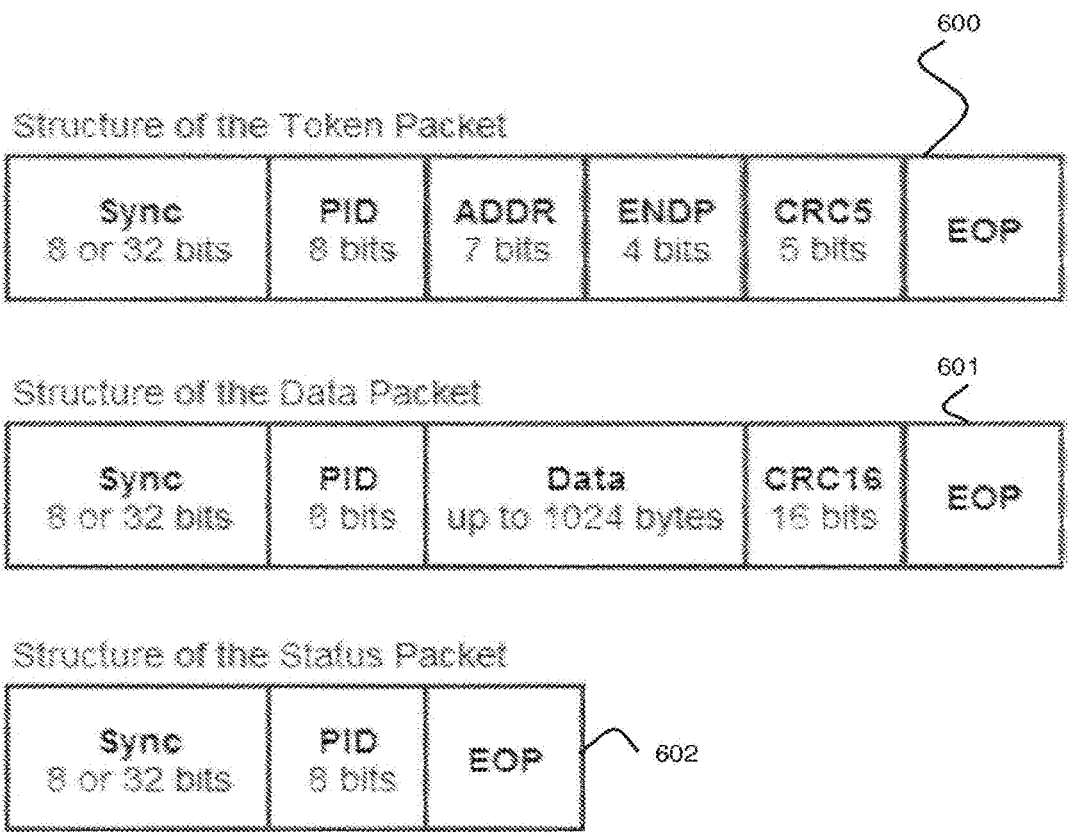
FIG. 6: shows a block diagram illustrating a message format of signals used within an embodiment of the invention.

FIG. 6 shows the format of signals expected by the application software from the virtual peripheral device in one embodiment of the invention.

Within that figure:

PID=Packet ID which identifies the type of packet being sent;

ADDR=Address field of device for which the packet is intended;

ENDP=Endpoint;

CRC=Cyclic Redundancy Check; and

EOP=End of Packet.

Token packets 600 are transmitted from the application software for receipt by the virtual peripheral device and are intercepted by the injection module.

In response to receipt of the token packets 600, data packets 601 are constructed and sent from the injection module to the application software.

In response to receipt of the data packets 601, status packets 602 are constructed and send from the application software for receipt by the virtual peripheral device but are intercepted by the injection module.

It can be seen from the above that the injection module may be configured to generate signals formatted in accordance with a message format, such as that described above. In this way the application software receiving the data believes that it comes from an existing peripheral and the existence of the injection module is transparent.

Figure 7:
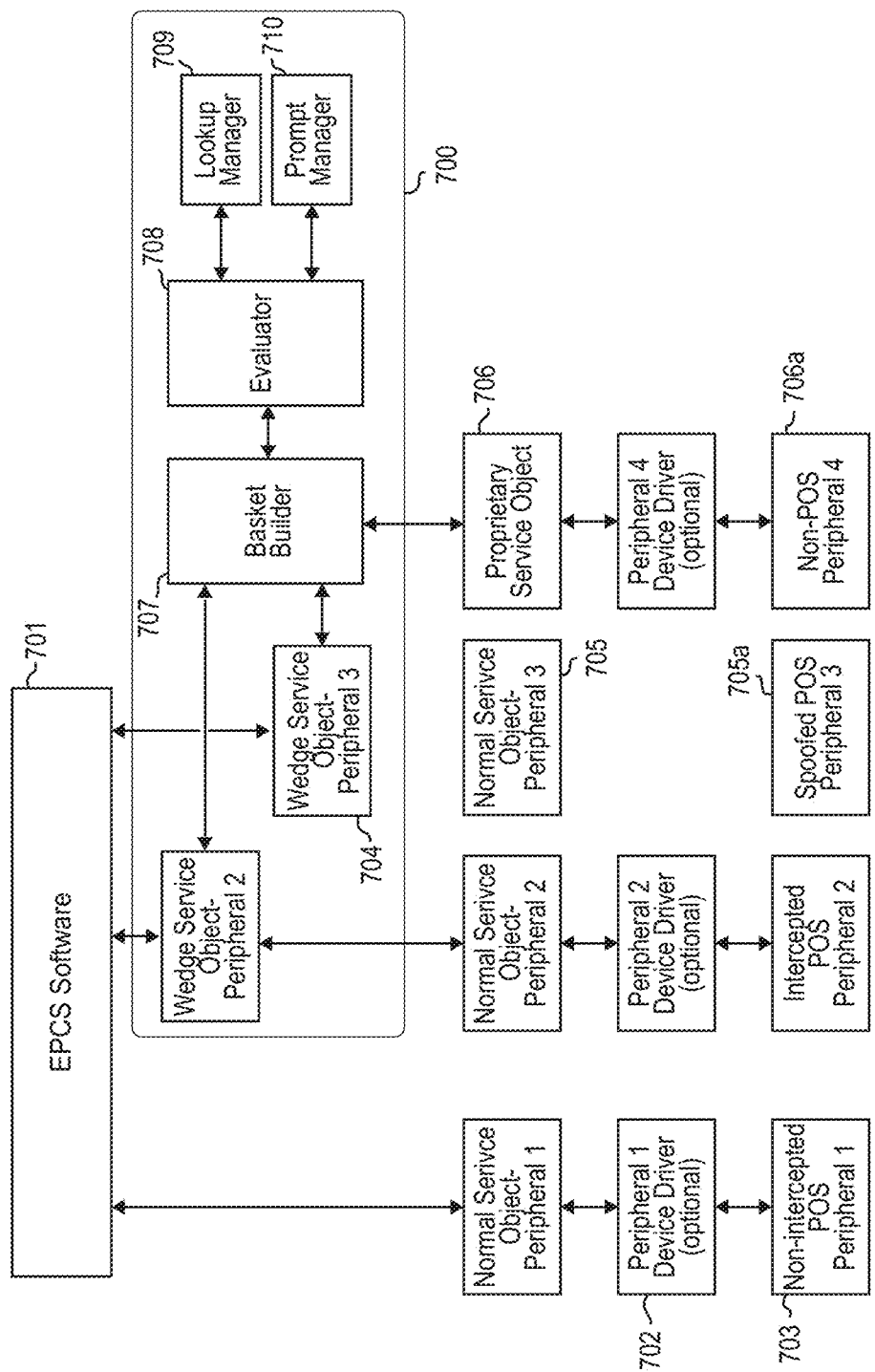
FIG. 7: shows a block diagram illustrating a software injection module within an operating system in accordance with an embodiment of the invention.

A software injection module in accordance with an embodiment of the invention will now be described with reference to FIG. 7.

The method will be described in relation to the use of a software injection module 700 executing on the computing system and in relation to the use for improving a computing system executing a point-of-sale (POS) software application 701.

The software injection module 780 is installed at the operating system level on the same device (the computing system) that is hosting the driver software 702 for the peripherals 703 expected by the POS 701.

To create and install the software injection module 700:

1. A software object 'wedge' 704 is created which presents the same interface to the POS application 701 as the original peripheral class 705 for a peripheral type which is known to the POS 701 but whose existence 705a will be spoofed to the POS 701.

2. The POS software 701 is configured to load the wedge object 704 instead of the original class 705.

3. The software injection module 700 in turn loads a service object 706 for a peripheral 706a of a type not known to the POS 701. A basket builder 707 component may, for example, load the service object and manage communication to/from the new peripheral 706a.

The following description is for POS for .NET but, with suitable modifications, the invention of substituting one object's registration with another would equally well work with other peripheral driver standards such as OPOS and JPOS.

Initially a software object 704 is created which presents the same interface to the POS as the original bar scanner class. In POS for .NET these objects are called Service Objects or SOs. The POS software 701 must then be configured to load the created SO instead of the original class 705. How this happens will be dependent upon the client software 701. For example, if the client software 701 has a configuration file containing the name of an SO to load then this may be altered to load the wedge 704 instead. If no such configuration file is available and the SO is being loaded by name directly then the replacement object 704 could be given the same name as the original 705 and copied in its place on the filing system.

A POS for .NET service object browser object can be used to retrieve a list of available SOs which may be queried according to the device type they represent. A registry key contains values representing directories where service object binaries reside. This is used by the browser to find SOs. The wedge object's directory is added to this key. A mechanism exists in POS 701 for .NET to redefine the hardware device with which an SO is associated, and this may be used to dynamically link the wedge SO 704 with a particular hardware device ID at installation time. A config file is written which maps the hardware ID to a particular SO's name, and this is placed in a folder which is added to another registry key used by POS for .NET to locate such config files. At device instantiation time POS for .NET will load any config files it finds and dynamically use the mapping contained within to load the appropriate SO for the device with the referenced hardware ID being opened. The ID of the hardware to be replaced can be extracted from metadata exposed by the device's hardware manager.

The wedge SO 704 may be created so that it fully implements the class hierarchy which is being spoofed. For example the POS for .NET standard defines a class for scanners which has at its top level a class called ScannerBase. This in turn inherits from multiple other classes, all of which can be implemented in order to maintain the inheritance hierarchy and polymorphic nature of the class.

Once this process is complete, when an interface method is called by the POS 701. It is thus calling the associated method on the wedge 704 and when an event is triggered by new data, it is similarly being fed back to the POS 701 via the wedge 704. As long as the wedge object 704 and basket builder 707 manage the methods and events from the POS Software 701 and repackage any messages from new peripheral 706a, the POS Software 701 will operate as if the wedge object 704 did not exist and will believe it is interfacing with a known peripheral 705a.

The wedge 704 and basket builder 707 can include further processing logic to redirect the method and event data to other software modules 708 to 710 to process the received data and, based on instructions from those modules, replace, discard or inject new data into the original data travelling to/from new peripheral 706a.

A sequence diagram showing message flow within a data transmission system in accordance with an embodiment of the invention will now be described with reference to FIG. 8.

A code is scanned by, for example, a QR or RFID scanner and the data is sent in step 800 to the application software for an electronic point-of-sale (EROS) terminal. The QR or RFD scanner may not be known to the EPOS terminal.

The code may be presented for scanning during the scanning of a series of goods for a customer. The series of goods, and any associated coupons, personal identifiers and payment tokens, will be termed a basket.

An injection module receives the code and sends the code to a basket builder and evaluator module in step 801.

The basket builder and evaluator module adds any goods it identifies within the code to the basket it is tracking for the customer in step 802. The injection module may also receive codes to build the basket from other peripherals such as barcode scanners.

The basket builder and evaluator module may teen make a lookup request using the code from a remote server in step 803. For example, if the code relates to a presented coupon rather than a particular good, the basket builder and evaluator may need to verify if the coupon is valid.

The basket builder and evaluator module may evaluate the current basket for the customer to determine if the goods within the basket qualify for a particular action (e.g. a discount) in step 804.

The basket builder and evaluator module may prompt for input from the EPOS user/operator before applying an action in step 805. For example, there may be local conditions that the user is required to verify (e.g. is the customer is over the age of 65 or is female, etc.) These local conditions may be required, for example, in relation to a presented coupon or to the particular discounts presently in effect. Alternatively, the prompt may inform the EPOS operator that a coupon appears to be invalid and giving them the option to accept or reject the coupon; or the prompt may request a code for a one-time CAN (Coupon Authentication Number) protected coupons, which the customer or operator enters (the code may then checked for previous use).

The basket builder and evaluator module may prompt for input at different times during the process.

The basket builder and evaluator module may then generate instructions, in step 806, for the injection module based on one or more of the constitution of the basket, the validity of any presented coupon and the verification of the required elements.

The instructions may result in the injection module generating data in step 807 which would instruct an action known to the EPOS (for example, applying a discount of a specified amount or percentage). The data may be sent in step 808 to the EPOS software by, for example, injecting the data into a spoofed communications channel created by the injection module between a virtual peripheral and the EPOS software.

Figure 8:
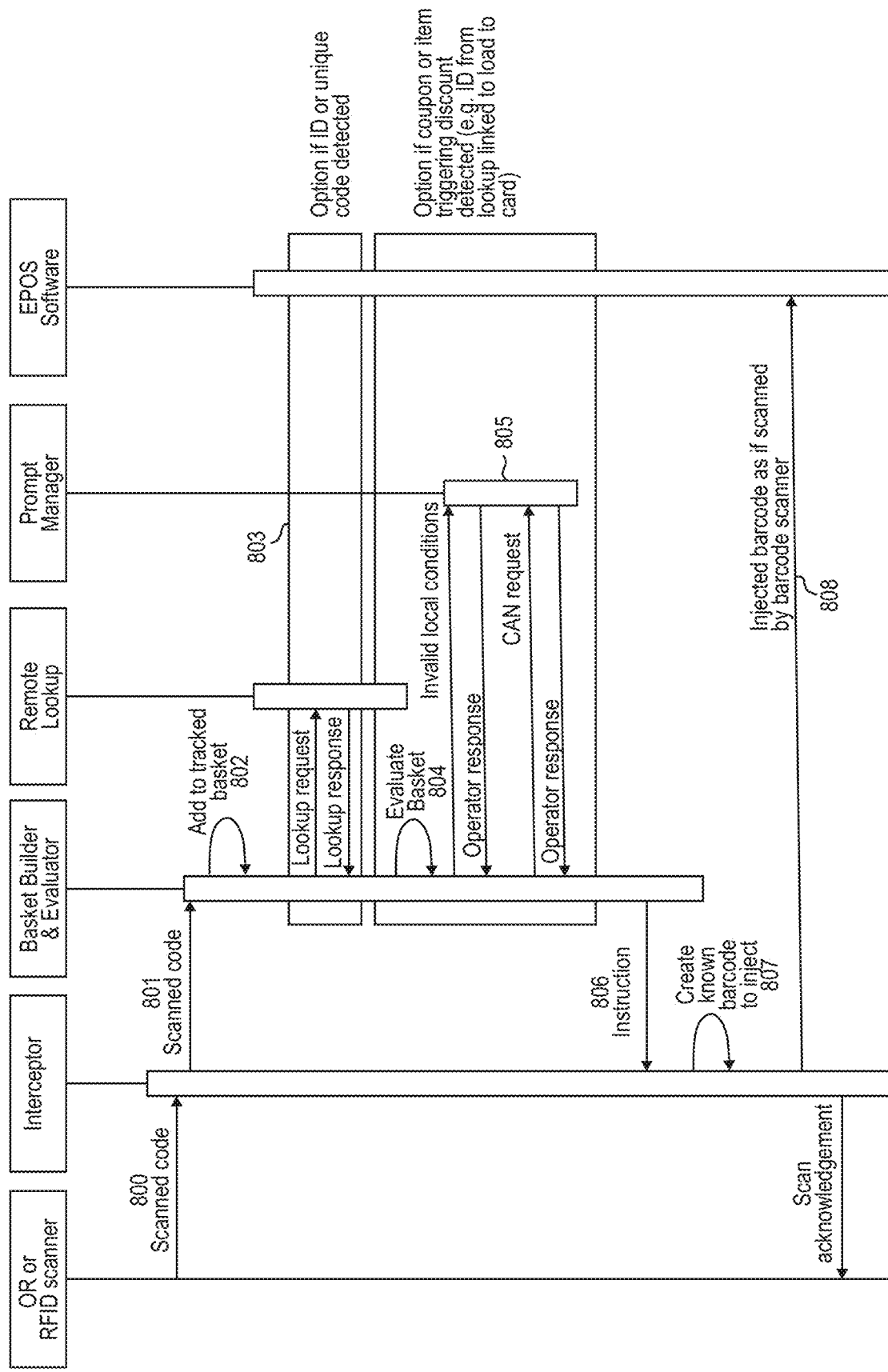
FIG. 8: shows a sequence diagram illustrating message flow within a method in accordance with an embodiment of the invention.

Although FIG. 8 shows a RFID scanner as the source of a scanned code, the injection module can equally intercept data feeds from one or more further peripherals including standard EPOS peripherals (e.g. cash drawer, receipt printer), proprietary peripherals, and commodity peripherals.

Instructions returned to the injection module by the basket builder and evaluator module can be multiple instructions. So a QR Ode scanned by a proprietary optical scanner could lead to multiple injected barcodes sent as if from a barcode scanner.

The injection module can be either hardware or software based with messaging being the same.

Figure 9:
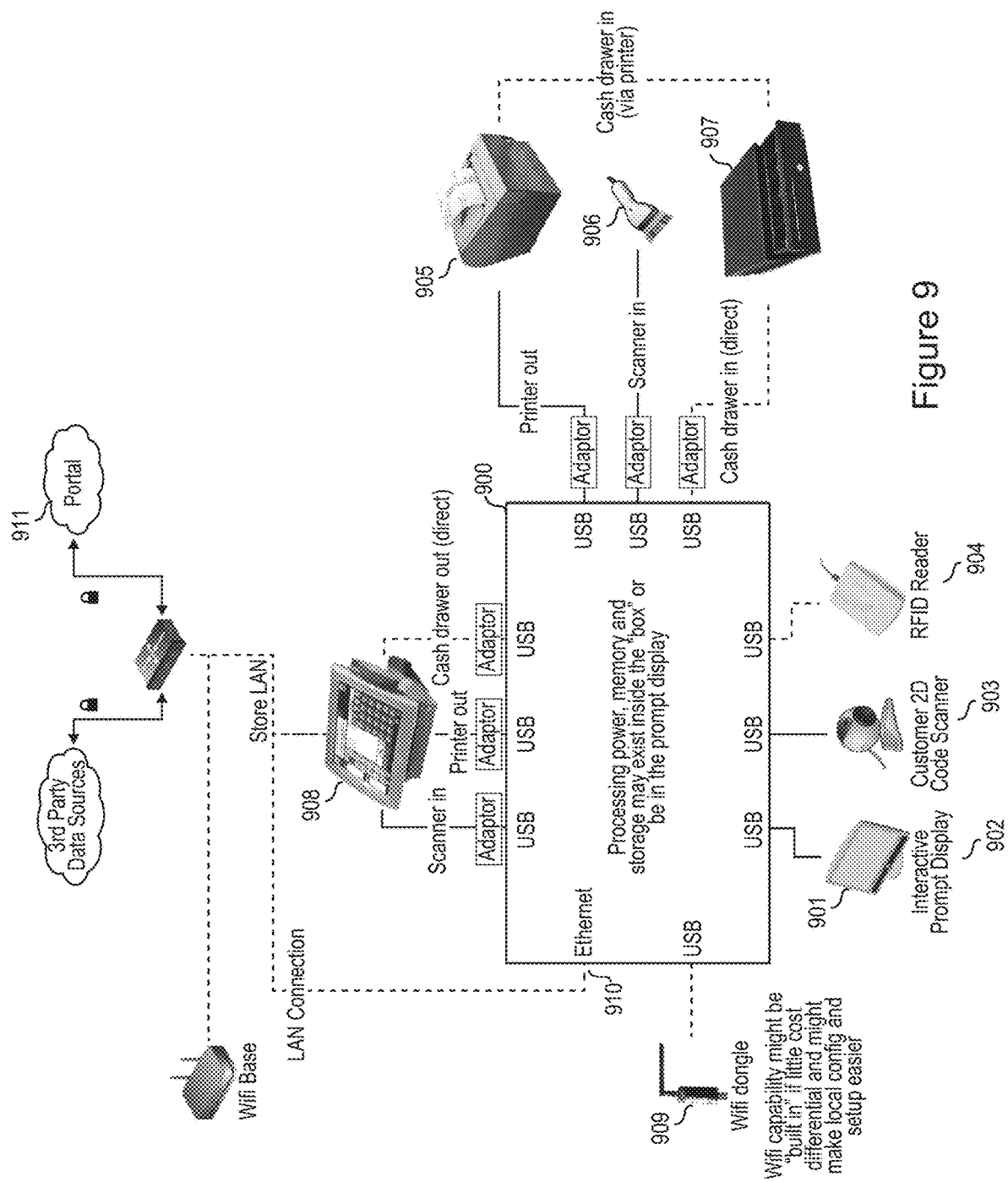
FIG. 9: shows a data processing system in accordance with an embodiment of the invention.

An injection module implemented within an injection apparatus in accordance with an embodiment of the invention will now be described with reference to FIG. 9.

The injection apparatus may comprise a processor and memory within a communications hub 900 or within an attached interactive display 901 (a display and an input).

Communications routed through the hub 900 may be received by the injection module.

The communications hub 900 may have USB connections or other communications inputs. Adaptors may be used to connect non-USB inputs/outputs to the USB connections.

Input and output peripherals 902 to 907 may be connected to the communications hub 900.

The communications hub 900 may be connected to an electronic point-of-sale (POS) terminal 908 through one or more communication connections. For example, the POS terminal 908 may utilise industry standard input/output connections such as "scanner in", "printer out", and "cash drawer out".

The communications hub 900 may include a will dongle 909 and/or an Ethernet connection 910 to communicate with an external Server 911.

Where the injection module injects a new barcode, it will 'hijack' a token packet sent from the POS 908 and return its own data packet containing the injected code. After receipt of the resulting status packet from the POS, and assuming no other configurations would prevent it, normal communications between the peripheral and POS are then resumed.

Note that in an alternative configuration, the injection module may never block any communications between a standard peripheral 905 to 907 and host 908. In this configuration, a prompt will be triggered after a coupon barcode has already been passed to the POS 908 (potentially relying upon the POS operator to manually remove an invalid coupon) and a new code will be injected (for example) by spoofing an extra barcode scanner. This configuration may be required for increased reliability in a retail environment.

A potential advantage of some embodiments of the present invention is that data can be transmitted to an application on a computing system where the application is configured to interoperate with an expected external peripherals without requiring the application to be modified. Accordingly, a data transmission system in accordance with the invention results in an improved computing system which can execute legacy software whilst remaining reliable.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A data transmission method, including:
   a software injection module constructing a communications channel between a peripheral device for a computer system and an application executing on the computer system, the application configured to load an original peripheral class for a peripheral type which is known to the application;
   the software injection module injecting signals into the communications channel for receipt by the application, wherein the software injection module includes a software wedge object;
   configuring the application to load the software wedge object instead of the original peripheral class; and
   the application loading the software wedge object instead of the original peripheral class, wherein the software wedge object presents the same interface to the application as the original peripheral class for the peripheral type which is known to the application but whose existence will be spoofed to the application, and the software injection module loads a service object for a peripheral of a type not known to the application, and wherein the configuring the application to load the software wedge object instead of the original peripheral class comprises modifying a configuration file of the application to load the software wedge object instead of the original peripheral class, or wherein the configuring the application to load the software wedge object instead of the original peripheral class comprises substituting the registration of the original peripheral class with the registration for the software wedge object.

2. The data transmission method as claimed in claim 1, wherein the peripheral device is a virtual peripheral device and the communications channel is constructed by spoofing the existence of the virtual peripheral device.

3. The data transmission method as claimed in claim 1, wherein the peripheral device is an input device.

4. The data transmission method as in claim 1, wherein the signals are created in response to preceding signals intercepted from a further peripheral device to the application.

5. The data transmission method as in claim 1, wherein the signals are created, at least in part, in accordance with a stored set of instructions.

6. The data transmission method as in claim 1, wherein the signals are created, at least in part, with the assistance of an external server.

7. The data transmission method as in claim 1, wherein the signals are injected at the operating system level.

8. The data transmission method as in claim 1, wherein the signals are injected by an intermediary hardware device into which the peripheral device is connected and which in turn is connected to the computer system.

9. The data transmission method as in claim 1, wherein the peripheral device is a barcode reader.

10. The data transmission method as claimed in claim 1, wherein configuring the application to load the software wedge object instead of the original peripheral class comprises modifying a configuration file of the application to load the software wedge object instead of the original peripheral class.

11. The data transmission method as claimed in claim 1, wherein configuring the application to load the software wedge object instead of the original peripheral class comprises substituting the registration of the original peripheral class with the registration for the software wedge object.

12. A data transmission system, comprising:
a processor configured for:
constructing a communications channel between a peripheral device for a computer system and an application executing on the computer system and injecting signals into the communications channel for receipt by the application using a software injection module, the application configured to load an original peripheral class for a peripheral type which is known to the application, wherein the software injection module includes a software wedge object; and configuring the application to load the software wedge object instead of the original peripheral class, wherein the software wedge object presents the same interface to the application as the original peripheral class for the peripheral type which is known to the application but whose existence will be spoofed to the application, the application loads the software wedge object instead of the original peripheral class, and the software injection module loads a service object for a peripheral of a type not known to the application, and wherein the configuring the application to load the software wedge object instead of the original peripheral class comprises modifying a configuration file of the application to load the software wedge object instead of the original peripheral class, or wherein the configuring the application to load the software wedge object instead of the original peripheral class comprises substituting the registration of the original peripheral class with the registration for the software wedge object.

13. The data transmission system as claimed in claim 12, further comprising:
the computer system including the processor.

14. The data transmission system as claimed in claim 12, further comprising:
an interceptor apparatus, wherein the interceptor apparatus comprises the processor.

15. The data transmission system as claimed in claim 12, further comprising:
a display configured for displaying prompts to a user of the computer system, wherein the processor is further configured for generating the display of prompts and receiving the responses, and wherein the signals are generated, at least in part, on the responses.

16. The data transmission system as claimed in claim 12, further comprising: one or more peripherals, and wherein the processor is further configured for receiving data from the one or more peripherals and wherein the signals are generated, at least in part, on the data received from the one or more peripherals.

17. The data transmission system as claimed in claim 16, wherein at least one of the one or more peripherals transmits data in a format unknown to the application.

18. The data transmission system as claimed in claim 12, wherein the peripheral is a virtual peripheral.

19. The data transmission system as claimed in claim 12, wherein the processor is configured to configure the application to load the software wedge object instead of the original peripheral class by modifying a configuration file of the application to load the software wedge object instead of the original peripheral class.

20. The data transmission system as claimed in claim 12, wherein processor is configured to configure the application to load the software wedge object instead of the original peripheral class by substituting the registration of the original peripheral class with the registration for the software wedge object.

21. A non-transitory computer-readable storage medium having stored therein a computer program for execution by a computer, the computer program, when executed, causes the computer to:
construct, using a software injection module, a communications channel between a peripheral device for a computer system and an application executing on the computer system, the application configured to load an original peripheral class for a peripheral type which is known to the application;

inject, using the software injection module, signals into the communications channel for receipt by the application, wherein the software injection module includes a software wedge object;

configure the application to load the software wedge object instead of the original peripheral class; and control the application to load the software wedge object instead of the original peripheral class, wherein the software wedge object presents the same interface to the application as the original peripheral class for the peripheral type which is known to the application but whose existence will be spoofed to the application, and the software injection module loads a service object for a peripheral of a type not known to the application, and wherein the configuring the application to load the software wedge object instead of the original peripheral class comprises modifying a configuration file of the application to load the software wedge object instead of the original peripheral class, or wherein the configuring the application to load the software wedge object instead of the original peripheral class comprises substituting the registration of the original peripheral class with the registration for the software wedge object.

22. The non-transitory computer-readable storage medium as claimed in claim 21, wherein the computer program, when executed, is configured to configure the application to load the software wedge object instead of the original peripheral class by modifying a configuration file of the application to load the software wedge object instead of the original peripheral class.

23. The non-transitory computer-readable storage medium as claimed in claim 21, wherein the computer program, when executed, is configured to configure the application to load the software wedge object instead of the original peripheral class by substituting the registration of the original peripheral class with the registration for the software wedge object.

* * * * *